UNITED STATES PATENT OFFICE.

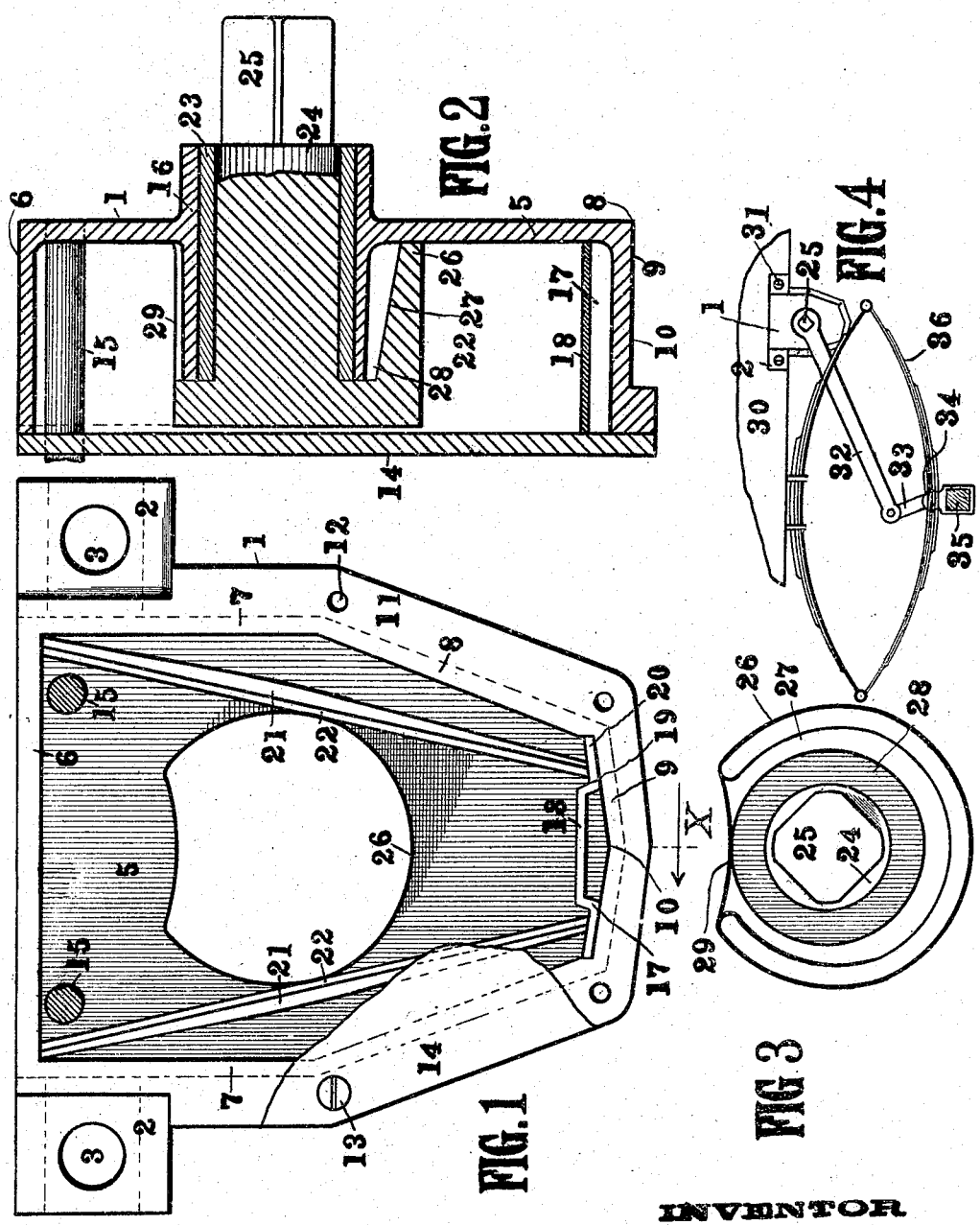

PHELPS M. FREER, OF BARBERTON, OHIO, ASSIGNOR OF ONE-FOURTH TO WILLIAM W. POPE AND ONE-FOURTH TO CHARLES W. HAWKINS, BOTH OF AKRON, OHIO.

SHOCK-ABSORBER.

No. 930,467.  Specification of Letters Patent.  Patented Aug. 10, 1909.

Application filed October 29, 1908. Serial No. 460,160.

*To all whom it may concern:*

Be it known that I, PHELPS M. FREER, a citizen of the United States, residing at Barberton, in the county of Summit and State of Ohio, have invented new and useful Improvements in Shock-Absorbers, of which the following is a specification.

This invention relates to shock absorbers primarily designed for use in absorbing or neutralizing a shock communicated to an instrumentality by a second instrumentality connected therewith by springs and the object thereof is to provide a device of the class named primarily designed for use in connection with self-propelled vehicles, to absorb or neutralize the sudden shock incident to the use of vehicle springs on the roadway and to prevent transmission of a sudden vertical movement of the axle relative to the body thereof.

A further object of this invention is to provide a device which will be simple, strong, durable in use, easily manufactured, possessed of a high degree of efficiency and one which is capable of employment in connection with any type of springs, either those in use on a vehicle or where used in any other connection.

A still further object of this invention is to so construct the device that it may be applied to completed vehicles of substantially any variety with little or no alteration in the general make up thereof, thereby making it a substantially universally applicable device.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, illustrated by way of example in connection with the rear axle, spring and body of the vehicle, but it is to be understood that changes, variations and modifications can be resorted to which come within the scope of the claims hereunto appended.
In the drawings, in which similar reference numerals indicate like parts in the different figures: Figure 1 is a view in side elevation of the rear face of the device with a portion of the cover therefor broken away to better illustrate the interior thereof. Fig. 2 is a vertical, central, sectional view of a device embodying this invention on line X of Fig. 1. Fig. 3 is a view in end elevation of a cam employed; and, Fig. 4 is a view in side elevation of the device shown in Figs. 1 and 2 in operative relation with respect to the rear portion, axle and springs of a vehicle.

Referring to the drawings in detail, the reference numeral 1 denotes a casing preferably of the general shape shown in the drawings, provided with laterally-extending integral lugs 2 having openings 3 through which may extend holdfast devices for securely positioning the device. The casing is further provided with a wall 5 from which extends an end flange 6 and two laterally, preferably parallel flanges 7 from which extend converging flanges 8 united by two flanges 9 preferably meeting at an apex 10 in the form of an obtuse angle. Extending laterally from the flanges 7, 8 and 9 is a continuous integral flange 11 through which extend threaded openings 12 to receive screws 13 for securing thereon a cover 14.
The wall 5 and cover 14 are provided with alined openings to receive two transversely-extending bolts 15, for a purpose to be stated. The wall 5 is also provided with an approximately central opening provided with a hub 16 in which is mounted a rotary cam, hereinafter more fully described.

Mounted on the flange 9 is a shoe 17 consisting of an approximately horizontal portion 18 terminating at its ends in shoulders 19 from which extend portions 20 arranged to abut against the lateral flanges 8. Extending approximately from the shoulder 19 of the member 17 to each of the corners formed by the flanges 6 and 7 of the device, are a pair of spring resilient members 21, of a width sufficient to extend from the wall 5 to the cover 14, with their medial portions thickened to decrease the flexibility thereof. On the inner faces of each of the resilient members 21 is preferably placed a wear-resisting member 22 composed of some such material as vulcanized fiber or its equivalent.

Mounted in the opening surrounded by the hub 16 is a friction-reducing bushing 23 within which is a cam comprising a cylindrical portion 24, mounted in the bushing 23 and from which extends a preferably squared projecting shank 25. The opposite end of the cylindrical portion 24 is preferably cup-shaped and formed with a periphery 26, a part of which is eccentric to the axis of the cylindrical portion 24. The inner face of the peripheral cam-shaped portion 26 is inclined inwardly at 27 forming an annular recess 28, whereby when said cylindrical portion is inserted in the bushing 23 the cam-shaped peripheral portion 26 will telescope the hub 16, and the bushing 23 will project inwardly into the recess 28, thereby constituting substantially telescoping members. The surface of the periphery 26 is interrupted at the point indicated by the reference numeral 29 by an approximately concave portion, for a purpose to be described.

In setting up a device embodying the structure just described, the cover 14 of the member 1 is removed and the shoe 17 placed in position. One of the members 21 with its protective wear-resisting strip 22 is then forced edgewise into position, with the lower ends thereof resting against the shoulder 19 of the member 17 and with their upper ends in the angle formed by the intersection of the flanges 6 and 7. The shank 25 and cylindrical portion of the cam are then inserted in the opening formed by the bushing 23 with the concave portion of the periphery of the cam 29 turned toward the already positioned members 21 and 22, and as the radius of the concaved portion of the cam which is toward the members 21 and 22 is less than the balance thereof, it may be properly seated without encountering the members 21 and 22. After the cam has been properly seated, a proper tool is applied to the squared shank 25 and it is rotated in such a manner as to bring the portion 29 opposite the position to be occupied by the other pair of members 21 or 22 which may then be readily inserted edgewise into their seats in a manner similar to the seating of the two members 21 or 22. The cam is then rotated so as to bring it to a position substantially as shown in Fig. 1, with the concave portion 29 at the top and with those portions of the cam having the larger radii in frictional engagement with the members 22, and in consequence of the enlarged portion of the cam being brought to bear against the members 21 provided with their wear-resisting protective members 22 the members 21 will be under tension at all times when the parts are assembled, so that the cam 24 will have no tendency to move without the application of power to the shank 25; in other words, when the cam 24 has been partially rotated it will not return to its former position without the application of extraneous force. From the fact that the members 21 are under tension at all times when the device is set up and engage the cam-shaped portion 26 on opposite sides thereof, the thrust on the bearing is to a large extent equalized thereby reducing the wear incident to the use of the device. In view of this fact, free rotation of the cam is effectually retarded by this frictional engagement between it and the members 22 and this retarding of the rotation of the cam is the primary feature sought to be accomplished by this invention. After the cam and the members 21 and 22 have been seated, the cover 14 is placed over the flange 11 and positioned by means of the holdfast devices 13. The cover 14 is provided with suitable apertures to receive the bolts 15, which serve the two-fold purpose of preventing accidental displacement of the upper ends of the members 21 and 22 and also serve as means for aiding in securing the entire device to a supporting medium.

The operation of the device is shown diagrammatically in Fig. 4 in which the device is secured to the frame 30 of a vehicle by holdfast devices 31, with the lower end thereof depending. A lever 32 is then attached to the squared shank 25 and its outer end is pivotally-connected to a link 33 pivotally-attached to a member 34 fixedly-secured to the axle 35 of the vehicle, which is also provided with the customary elliptical springs 36. It will be obvious of course that the device may be attached to the axle of the vehicle and the link 33 be pivotally attached to the body 30, thereby reversing the position of the members, but the device performs the same function in either position. The vertical movement of the axle 35 of the vehicle during its progress over the roadway will cause the link 33 to oscillate the lever 32 causing thereby a rotary movement of the cam in its bearing. This rotary movement of the cam is resisted by the frictional contact of the peripheral portion thereof with the wear-resisting members 22 held thereagainst by the resilient action of the spring members 21, which maintain constant pressure against the periphery of the cam.

From the foregoing it will be seen that this device affords an unusually simple and effective device to neutralize or absorb the sudden relative movement of one instrumentality such as the axle of the vehicle with respect to the position of another instrumentality, and while this device has been described with reference to and in connection with vehicles, its usefulness in other places will be apparent.

What I claim and desire to secure by Letters Patent, is:—

1. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally-connected to a complementary instrumentality and a yieldable braking member embodying a bar with its medial portion disposed in frictional engagement with the periphery of said cam-shaped portion and tangential thereto for causing resistance to the movement of one instrumentality with respect to the other.

2. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally-connected to a complementary instrumentality and a yieldable braking member embodying a bar having a thickened medial portion adapted to be disposed tangentially with respect to the cam-shaped portion of said element to engage the periphery thereof for causing resistance to the movement of one of said instrumentalities with respect to the other.

3. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally connected to a complementary instrumentality and a yieldable braking member embodying a bar with a thickened medial portion disposed with the thickened portion thereof in engaging relation with the periphery of said element and tangentially thereto for causing resistance to the movement of one instrumentality with respect to the other.

4. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally-connected to a complementary instrumentality, a yieldable braking member embodying a bar with a thickened medial portion disposed with the thickened portion in frictional engagement with the periphery of said cam-shaped portion and means for supporting said braking member tangentially to said cam-shaped portion for causing resistance to the movement of one instrumentality with respect to the other.

5. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally-connected to a complementary instrumentality, a yieldable braking member, having a thickened medial portion provided with a liner of wear-resisting material disposed tangentially to said cam-shaped portion with the medial portion of said wear-resisting liner in frictional engagement with the periphery of said cam-shaped portion and means for supporting said member and liner in coöperating relation with said cam-shaped portion for causing resistance to the movement of one instrumentality with respect to the other.

6. A device for neutralizing or absorbing the shock incident to the movement of two instrumentalities adapted to be connected by a spring, comprising a rotatable element suitably supported by one of said instrumentalities provided with a cam-shaped portion, an arm having one end thereof connected with said element for rotating the same, the opposite end of said arm being pivotally-connected to a complementary instrumentality, and a resilient braking member suitably supported with its medial portion in frictional engagement with the periphery of said cam-shaped portion and tangential thereto.

In testimony whereof I have hereunto set my hand in presence of two subscribing witnesses.

PHELPS M. FREER.

Witnesses:
C. E. HUMPHREY,
GLENARA FOX.